United States Patent [19]
Boudreaux, Jr.

[11] Patent Number: 5,296,527
[45] Date of Patent: Mar. 22, 1994

[54] POLYMETHYLPENTENE COMPOSITIONS

[75] Inventor: Edwin Boudreaux, Jr., Bartlesville, Okla.

[73] Assignee: Phillips Petroleum Company, Bartlesville, Okla.

[21] Appl. No.: 85,521

[22] Filed: Jun. 30, 1993

Related U.S. Application Data

[60] Division of Ser. No. 927,764, Aug. 10, 1992, Pat. No. 5,266,621, which is a continuation of Ser. No. 673,602, Mar. 21, 1991, abandoned.

[51] Int. Cl.$^5$ .................. C08F 283/00; C08L 81/00
[52] U.S. Cl. .................. 524/502; 525/151; 525/537; 524/609
[58] Field of Search ........... 524/502, 609; 525/151, 525/537

[56] References Cited

U.S. PATENT DOCUMENTS 4,025,582 5/1977 Needham .................. 260/897 R

FOREIGN PATENT DOCUMENTS 0305539 8/1989 European Pat. Off. ...... C08L 23/26
0360439 3/1990 European Pat. Off. ...... C08L 23/20
62-131046 6/1987 Japan .

*Primary Examiner*—John C. Bleutge
*Assistant Examiner*—Helen F. Lee
*Attorney, Agent, or Firm*—Carl D. Corvin

[57] ABSTRACT

A high strength, thermally resistant, fire retardant, composition of matter is provided comprising (A) about 99.5 to about 75 weight percent of unmodified polymethylpentene where the weight percent of polymethylpentene is based on the total weight of A and B; and (B) about 0.5 to about 25 weight percent of polyphenylene sulfide where the weight percent of polyphenylene sulfide is based on the total weight of A, and B; (C) about 10 to about 67 weight percent of a reinforcer where the weight percent of the reinforcer is based on the total weight of A, B, C, and D; (D) optionally about 5 to about 45 weight percent of a flame retardant where the weight percent of the flame retardant is based on the total weight A, B, C and D.

10 Claims, No Drawings

POLYMETHYLPENTENE COMPOSITIONS

CROSS-REFERENCE TO RELATED APPLICATION

This application is a division of application Ser. No. 07/927,764 which was filed on Aug. 10, 1992, U.S. Pat. No. 5,266,621, the entire disclosure of which is hereby incorporated by reference. Application Ser. No. 07/927,746 was a continuation of application Ser. No. 07/673,602 which was filed on Mar. 21, 1991 abandoned, the entire disclosure of which is hereby incorporated by reference.

BACKGROUND OF THE INVENTION

This invention relates to high strength, thermally resistant, fire retardant, polymethylpentene compositions.

Polymethylpentene, also known as PMP, has long been known in the art. Although many methods are known in the art for improving the performance characteristics of compositions like polyethylene and polypropylene, these same methods tend not to work in the higher alpha olefins, like PMP. Recently, great emphasis has been placed upon modifying the PMP polymer structure in order to improve the performance characteristics of this polymer. Most of these methods deal with creating a more interactive surface between the PMP polymer structure and the other constituents in the composition. It has been noted though, that the majority of these methods of improving PMP performance characteristics tend to be time consuming and somewhat expensive. Therefore, a method of producing a high strength, thermally resistant, fire retardant, PMP composition, in which the PMP polymer matrix does not have to be substantially altered, would be of great scientific and economic value.

SUMMARY OF THE INVENTION

It is an object of this invention to provide an improved PMP composition.

It is another object of this invention to provide a PMP composition with improved thermal resistance.

It is still another object of this invention to provide a PMP composition with improved fire retardant capabilities.

It is yet another object of this invention to provide a PMP composition with high strength and improved thermal resistance.

It is still another object of this invention to provide a PMP composition with high strength and improved fire retardant capabilities.

It is still another object of this invention to provide a PMP composition with high strength, improved thermal resistance, and improved fire retardant capabilities.

In accordance with this invention, a composition of matter is provided which comprises (A) about 99.5 to about 75 weight percent of unmodified polymethylpentene where the weight percent of polymethylpentene is based on the total weight of A and B; and (B) about 0.5 to about 25 weight percent of polyphenylene sulfide where the weight percent of polyphenylene sulfide is based on the total weight of A, and B; (C) about 10 to about 67 weight percent of a reinforcer where the weight percent of the reinforcer is based on the total weight of A, B, C, and D; (D) optionally about 5 to about 45 weight percent of a flame retardant where the weight percent of the flame retardant is based on the total weight A, B, C and D.

DETAILED DESCRIPTION OF THE INVENTION

Polymethylpentene (PMP)

The polymethylpentene utilized in the present invention is a homopolymer or a copolymer of a methyl-branched pentene, preferably 4-methyl-1-pentene, and another alpha olefin. Generally, applicable comonomers have from about 2 to about 18 carbon atoms and preferably, have from about 8 to about 16 carbon atoms. Most preferably, the comonomer or comonomers are linear alpha-olefins. Longer chain linear alpha-olefins are preferred in that they are easier to copolymerize with polymethylpentene and can, in part, increase clarity, stability, and impact strength to the resulting composition. Exemplary comonomers include, but are not limited to, 1-octene, 1-decene, 1-dodecene, 1-tetradecene, 1-hexadecene, and other higher alpha-olefins.

Generally the PMP should have a melt viscosity, measured as the melt flow rate, of about 0.5 to 500 grams per 10 minutes according to ASTM D1238, procedure B, under a load of 5 kilograms and a temperature of 260° C., and preferably 5 to 150 grams per 10 minutes. These flow rates tend to provide the most desired polymer composition processing rates.

The amount of polymethylpentene to utilize in this invention is from about 75 weight percent to about 99.5 weight percent. More preferably, it is from about 91 weight percent to about 99 weight percent and most preferably it is from about 92 weight percent to about 98 weight percent, based on the total weight of PMP and PPS. Other additives, which do not interfere with the compositions at hand, such as stabilizers, corrosion inhibitors, and colorants, etc., can be added to the PMP composition to provide additional desired variations from the main PMP compositions disclosed herein. If any additives are added then the weight of PMP used in the calculations of the weight percents in this specification is equal to the weight of PMP plus the weight of the additives. However, it should be noted that the PMP polymer structure is unmodified. By the term "unmodified" it is meant that the polymer has no grafting agents acting upon it in order to modify its polymer matrix.

Polyphenylene sulfide (PPS)

The polyphenylene sulfides utilized in the present invention are well known in the art and are described in U.S. Pat. Nos. 3,354,129; 3,396,110; 3,919,177; and 4,025,582; which are hereby incorporated by reference. The polyphenylene sulfide useful in accordance with this invention preferably has a melt flow, when tested in accordance with ASTM D-1238 at 315° C. using a 5 kilogram weight, of 1 to about 2,500 grams per 10 minutes.

The amount of PPS to utilize in this invention is from about 0.5 weight percent to about 25 weight percent where the weight percent of PPS is based on the weight of PMP and PPS. More preferably, it is from about 1 to about 9 weight percent and most preferably it is from about 2 to about 8 weight percent. The rationale for these ranges is that, while increasing the amount of polyphenylene sulfide in the composition tends to increase the thermal resistance of the polymethylpentene composition, the benefit of adding additional large increments of polyphenylene sulfide does not outweigh the cost. Indeed, practically speaking, small amounts of PPS can be used to obtain large increments of thermal resistance so that further additions of PPS do not bring cost effective advantages.

Reinforcing Agents

The reinforcing agents usable in the present invention include, for example, glass fiber, carbon fiber, boron fiber, and other inorganic substances, etc. Glass fiber reinforcements are available in a variety of compositions, filament diameters, sizings, and forms. The most commonly used composition for reinforced thermoplastics is E Glass, a boroaluminosilicate.

The diameter of the glass fiber is preferably less than 20 micrometers, but may vary from about 3 to about 30 micrometers. Glass fiber diameters are usually given a letter designation between A and Z. The most common diameters encountered in glass reinforced thermoplastics are G-filament (about 9 micrometers) and K-filament (about 13 micrometers). Several types of glass fiber products can be used for reinforcing thermoplastics. These include yarn, woven fabrics, chopped strands, mats, etc. Continuous filament strands are generally cut into lengths of ⅛, 3/16, ¼, ⅓, ½, and 1 inch or longer for compounding efficiency in various processes and products.

The glass fiber products are usually sized during the fiber formation process or in a post treatment. Sizing compositions usually contain a lubricant, which provides protection for the glass fiber strand; a film former or binder that gives the glass fiber strand integrity and workability; and a coupling agent that provides better adhesion between the glass fiber strand and the polymeric materials that are reinforced with the glass fiber strand. Additional agents that may be used in sizing compositions include emulsifiers, wetting agents, nucleating agents, and the like.

The amount of sizing on the glass fiber product typically ranges from about 0.2 to 1.5 weight percent based on the weight of the glass, although loadings up to 10 percent may be added to mat products. Examples of film formers include polyesters, epoxy resins, polyurethanes, polyacrylates, polyvinyl acetates, polyvinyl alcohols, starchs, and the like. Usually the coupling agent is a silane coupling agent that has a hydrolyzable moiety for bonding to the glass and a reactive organic moiety that is compatible with the polymeric material that is to be reinforced with the glass fibers.

Preferably the amount of reinforcers used are present in about 10 to about 67 weight percent, based on the weight of PMP, PPS, the reinforcer and the optional flame retardant. Preferably, the glass fibers are present in the range of about 10 to about 55 weight percent, and most preferably in the range of about 10 to about 45 weight percent. Not enough glass fiber does not improve the polymer properties and too much glass fiber results in not enough polymer to coat the glass fiber, i.e., the fibers are not wetted out.

Flame Retardants

Flame retardants utilized in the present invention include, but are not limited to, phosphate acid esters such as tricresyl phosphate, tributyl phosphate, tris(dichloropropyl)phosphate, and tris(2,3-dibromopropyl)-phosphate; halogenated hydrocarbons such as chlorinated or brominated, ethane, propane, butane, and cyclodecane; halogenated polymers such as chlorinated or brominated, polyethylene, polypropylene, polystyrene, and polycarbonates; brominated or chlorinated diphenyl oxides such as octabromodiphenyl oxide, and decabromodiphenyl oxide; antimony type compounds such as antimony trioxide, antimony potassium tartarate; boron type compound such as borax, zinc borate, barium metaborate; and metallic hydroxides such as magnesium hydroxide, aluminum hydroxide, calcium hydroxide, barium hydroxide, etc. Most preferably the flame retardant is selected from the group consisting of antimony type compounds, boron type compounds, polybrominated diphenyl oxides, brominated polystyrenes, polydibromophenylene oxides, brominated polycarbonate derivatives, or mixtures thereof.

Preferably the amount of flame retardant used is between about 5 weight percent to about 45 weight percent based on the weight of PMP, PPS, reinforcer, and flame retardant. More preferably, the amount used is between about 10 weight percent to about 40 weight percent, and most preferably is from about 15 to about 36 weight percent.

EXAMPLES

These examples are provided to further assist a person skilled in the art with understanding this invention. The particular reactants, conditions, and the like, are intended to be generally illustrative of this invention and are not meant to be construed as unduly limiting the reasonable scope of this invention.

The following ASTM test procedures were utilized in the testing.

| Analysis | ASTM Method No. |
| --- | --- |
| Tensile Strength at Break | D638, at 5 mm/min. |
| Elongation at Break | D638, at 5 mm/min. |
| Flexural Strength | D790, 2 inch span, 1 mm/min. crosshead speed |
| Flexural Modulus | D790, 2 inch span, 1 mm/min. crosshead speed |
| Izod Impact Strength, Notched and Unnotched | D256 |
| Heat Deflection Temperature (HDT) (°C.) | D648, at 264 psi |

Experimental Materials

Dry blends of polymethylpentene (PMP) and polypropylene (PP) were prepared, respectively, by drum tumbling 10 kilograms of resin with 5 grams of $Mg_4Al_2(OH)_{12}CO_3 \cdot 3H_2O$ (DHT-4A), 50 grams of Irganox 1010, 50 grams of Anoxsyn 442 and 10 grams of Weston 619 for 30 minutes. Since the total mass of each mix amounted to 10115 grams, a 101.15 gram portion was equivalent, respectively, to 100 parts PMP or PP, 0.05 phr DHT-4A, 0.5 phr Irganox 1010, 0.5 phr Anoxsyn 442 and 0.1 phr Weston 619.

The PMP/PPS formulations were compounded in a Werner & Pfleiderer ZSK-30 twin screw extruder (general purpose compounding screw/barrel configuration) at 250 rpm and 260°–290° C. temperature profile. The compositions were stranded, pelletized and dried overnight at 110° C. The PP/PPS formulations were compounded in a Werner & Pfleiderer ZSK-30 twin screw extruder at 250 rpm and 200°–230° C. profile. These compositions were also stranded, pelletized and dried overnight at 110° C.

The pelletized compositions were molded into ASTM test samples on a Engel Model EC88 injection molding machine with a 55 ton clamp force. The PPM/PPS blends were molded with a 136° C. mold temperature, 280°-295° C. barrel temperature and 30 second cycle time. The PP/PPS blends were molded with a 90° C. mold temperature, 220°-240° C. barrel temperature and 30 second cycle time. Molded parts were annealed for one hour at 150° C. before testing.

The formulations of the PMP and PP are illustrated along with the other materials in Table EM.

TABLE EM

A. Polymethylpentene Base Formulation

| | |
|---|---|
| 100.00 phr PMP | PMP Homopolymer, (18 MFR) |
| 0.05 phr DHT-4A | hydrotalcite, available from Mitsui Petrochemicals, Inc. |
| 0.50 phr Irganox 1010 | tetrakis (methylene 3-(3,5-di-t-butyl-4-hydroxyphenyl)propionate)methane, available from Ciba-Geigy |
| 0.50 phr Anoxsyn 442 | aliphatic thio compound, available from Atochem |
| 0.10 phr Weston 619 | distearyl pentaerythritol diphosphite, available from General Electric |

B. Polypropylene

| | |
|---|---|
| 100.00 phr PP | PP Homopolymer, (12 MFR) |
| 0.05 phr DHT-4A | hydrotalcite, available from Mitsui Petrochemicals, Inc. |
| 0.50 phr Irganox 1010 | tetrakis (methylene 3-(3,5-di-t-butyl-4-hydroxyphenyl)propionate)methane, available from Ciba-Geigy |
| 0.50 phr Anoxsyn 442 | aliphatic thio compound, available from Atochem |
| 0.10 phr Weston 619 | distearyl pentaerythritol diphosphite, available from General Electric |

C. Polyphenylene Sulfide

| Grade | Approximate[1] Flow Rate | Type | Wash |
|---|---|---|---|
| A | 2500 | uncured | water |
| B | 900 | cured | water |
| C | 120 | cured | water |
| D | 300 | uncured | acid |
| E | 160 | uncured | water |

[1]ASTM D1238 at 315° C. and 5 kg load, modified with a 5 minute preheat instead of a 6 minute preheat.

D. Glass Reinforcement Products

| Manufacturer | Product | Sizing[1] | Diameter[2] | Length (in) | LOI[3] |
|---|---|---|---|---|---|
| OCF[4] | 457BA[6] | PP | K | 3/16 | 0.90 |
| OCF | 408BC | PBT | K | 3/16 | 0.70 |
| OCF | 492AA | Nylon/PET | G | 1/8 | 1.10 |
| OCF | 497DC | PPS | K | 1/8 | 0.35 |
| CertainTeed[5] | 930 | PBT | K | 3/16 | 0.80 |
| CertainTeed | 93B | Nylon/PET | G | 1/8 | 1.00 |

[1]Indicates the resin for which the sizing package was optimized: PP represents polypropylene, PBT represents polybutylene terephthalate and PET represents polyethylene terephthalate.
[2]G-filament nominal diameter is 9 μm.
K-filament nominal diameter is 13 μm.
[3]LOI is the nominal ignition loss of the product. This is the percent organic solids of the sizing package.
[4]Owens Corning Fiberglas ™ Corp
[5]CertainTeed Glass Corporation
[6]All examples used OCF 457BA unless specified otherwise.

Example I

This example is provided to illustrate that the effect observed in polymethylpentene compositions does not occur in polypropylene compositions. Referring to the data in Table I it is evident that relatively small amounts of PPS did not enhance the HDT values in Runs 12, 13, and 14. Furthermore, it appears that PPS functions only as a filler in the polypropylene compositions.

TABLE I
PP and PPS Blends:
Properties as a Function of Polyphenylene Sulfide Level
(30% Glass Reinforced)

| Run Number | 11 | 12 | 13 | 14 |
|---|---|---|---|---|
| Percent PPS (Grade B) | 0 | 5 | 10 | 25 |
| Tensile Strength, Break (ksi) | 7.7 | 7.5 | 7.3 | 6.7 |
| Flexural Strength (ksi) | 10.8 | 10.7 | 10.4 | 9.8 |
| Flexural Modulus (ksi) | 806 | 821 | 803 | 849 |
| Unnotched Izod Impact (ft-lb/in) | 2.6 | 2.5 | 2.2 | 2.2 |
| HDT @ 264 psi (°C.) | 150.1 | 149.9 | 150.0 | 149.8 |
| ΔHDT/wt % PPS | — | −0.04 | −0.01 | −0.01 |

Example II

This example is provided to illustrate the effect observed in polymethylpentene/polyphenylene sulfide/-reinforced compositions. It is evident from the data below that relative small amounts of PPS enhanced the HDT values in PMP/PPS resins. For example, in Run 22, at a 5 weight percent PPS level, the HDT value was approximately 56% greater than the HDT value in Run 21 which contained no PPS. Furthermore, it can be seen from the data below, in the ΔHDT/weight percent PPS row, that increasing the weight percent of PPS does not proportionally increase the change in the heat deflection temperature.

TABLE II
PMP and PPS Blends:
Properties as a Function of Polyphenylene Sulfide Level
(30% Glass Reinforced)

| Run Number | 21 | 22 | 23 | 24 | 25 |
|---|---|---|---|---|---|
| Percent PPS (Grade B) | 0 | 5 | 10 | 25 | 50 |
| Tensile Strength, Break (ksi) | 6.3 | 6.2 | 6.1 | 6.3 | 6.3 |
| Flexural Strength (ksi) | 9.7 | 9.1 | 9.1 | 9.3 | 9.6 |
| Flexural Modulus (ksi) | 674 | 738 | 804 | 890 | 1,020 |
| Unnotched Izod Impact (ft-lb/in) | 2.1 | 2.2 | 2.5 | 2.3 | 1.4 |
| HDT @ 264 psi (°C.) | 111.0 | 173.3 | 176.2 | 195.1 | 217.7 |
| ΔHDT/wt % PPS | — | 12.5 | 6.5 | 3.4 | 2.1 |

Example III

Additional data was gathered to confirm the findings observed in Example II. This data is illustrated in Table III. It is apparent from the data, that at very low levels of PPS, a significant amount of thermal resistance can be attained. Furthermore, it can be seen from the data below, in the ΔHDT/wt. % PPS row, that increasing the weight percent of PPS does not proportionally increase the change in the heat deflection temperature. This is illustrated by the ΔHDT/weight percent PPS row which shows a dramatic decline from a 2.5 weight percent loading to a 20 weight percent loading.

TABLE III
PMP and PPS Blends:
Properties as a Function of Polyphenylene Sulfide Level Two
(30% Glass Reinforced)

| Run No. | 31 | 32 | 33 | 34 | 35 | 36 |
|---|---|---|---|---|---|---|
| Percent PPS (Grade B) | 0 | 2.5 | 5.0 | 7.5 | 10.0 | 20.0 |
| Tensile Strength (ksi) | 6.7 | 6.9 | 6.7 | 6.9 | 7.0 | 7.3 |
| Elongation (%) | 3.1 | 3.1 | 3.1 | 3.0 | 3.0 | 3.1 |
| Flexural Strength (ksi) | 9.3 | 8.9 | 8.8 | 8.5 | 8.9 | 9.1 |
| Flexural Modulus (ksi) | 815 | 809 | 822 | 805 | 856 | 891 |
| Notched Izod (ft-lb/in) | 0.9 | 1.0 | 0.9 | 0.9 | 0.9 | 0.8 |
| Unnotched Izod (ft-lb/in) | 2.5 | 2.7 | 2.6 | 2.7 | 2.9 | 2.2 |
| HDT at 264 psi (°C.) | 104.7 | 156.1 | 165.1 | 163.2 | 167.2 | 184.1 |
| ΔHDT/wt % | — | 20.6 | 12.1 | 7.8 | 6.3 | 4.0 |

Example IV

This example shows the properties of injection molded samples prepared from PMP/PPS molding compositions containing different grades of PPS at the 5 weight percent PPS level. The different grades of PPS are identified in Table EM. Results are summarized in Table IV.

Referring to the HDT values in Runs 41–45, it can be seen that this property varied over a range 157.3° to 164.2° C. This is a dramatic enhancement of HDT relative to the HDT value of 104.7° C. exhibited by the sample in Control Run 31 which contain no PPS. The general enhancement of HDT values in Runs 41–45 indicate that any of the five different types of PPS are suitable for use in the inventive composition.

TABLE IV

PMP and PPS Blends:
Effect of PPS Variant on Properties
(30% Glass Reinforced)

| Run No. | 41 | 42 | 43 | 44 | 45 |
|---|---|---|---|---|---|
| PPS Grade | A | B | C | D | E |
| Tensile Strength (ksi) | 7.1 | 6.9 | 6.6 | 6.8 | 7.1 |
| Elongation (%) | 3.2 | 3.2 | 3.2 | 3.2 | 3.2 |
| Flexural Strength (ksi) | 9.1 | 8.8 | 9.0 | 9.1 | 9.1 |
| Flexural Modulus (ksi) | 831 | 826 | 821 | 842 | 832 |
| Notched Izod (ft-lb/in) | 0.9 | 1.0 | 1.0 | 1.0 | 0.9 |
| Unnotched Izod (ft-lb/in) | 2.4 | 4.5 | 3.1 | 3.1 | 2.5 |
| HDT at 264 psi (°C.) | 158.1 | 157.3 | 160.9 | 157.5 | 164.2 |

Example V

This example shows the properties of injection molded samples prepared from 30% glass reinforced PMP/PPS molding compositions containing six different types of glass reinforcement. The different types of glass reinforcements are identified in Table EM. The polyphenylene sulfide was Grade B at the 5 weight percent level. The results are summarized in Table V.

Referring to Runs 53 and 56 in Table V, it is evident that the systems containing, respectively, OCF 492AA and Certainteed 93B gave the highest HDT values of 184.5 and 175.0. These glass reinforcements are sized for compatibility with Nylon/PET resins. The smaller filament diameters of these glass reinforcements perhaps accounted for the superior HDT values exhibited by the molded samples in Runs 53 and 56. The glass reinforcements sized for compatibility with polypropylene, polybutylene terephthalate and Nylon/PET resins imparted comparable mechanical properties to molded samples, respectively, in Runs 51, 52, 53, 55, and 56. Surprisingly, the glass reinforcement sized for compatibility with PPS (Run 54) provided molding samples which exhibited the lowest HDT values of the series.

It is noteworthy that all of the HDT values in Table V (regardless of the type of glass reinforcement) were significantly greater than that of control run 31.

TABLE V

PMP and PPS Blends:
Effect of Glass Reinforcement on Properties
(30% Glass Reinforced)

| Run No. | 51 | 52 | 53 | 54 | 55 | 56 |
|---|---|---|---|---|---|---|
| Glass Reinforcement | 457BA | 408BC | 492AA | 497DC | 930 | 93B |
| Tensile Strength (ksi) | 6.5 | 6.8 | 6.8 | 5.8 | 7.1 | 6.4 |
| Elongation (%) | 1.6 | 1.6 | 1.4 | 1.5 | 1.6 | 1.6 |
| Flexural Strength (ksi) | 8.7 | 8.6 | 8.7 | 7.7 | 9.3 | 8.2 |
| Flexural Modulus (ksi) | 800 | 789 | 832 | 789 | 834 | 789 |
| Notched Izod (ft-lb/in) | 0.9 | 1.1 | 1.2 | 1.0 | 1.2 | 1.0 |
| Unnotched Izod (ft-lb/in) | 2.9 | 2.9 | 3.6 | 3.0 | 3.1 | 3.4 |
| HDT at 264 psi (°C.) | 164.1 | 165.7 | 184.5 | 155.9 | 169.8 | 175.0 |

Example VI

This example shows the properties of injection molded samples prepared from 30% glass reinforced PMP/PPS molding compositions under somewhat varied processing conditions. The polyphenylene sulfide was Grade B at a 5% by weight level. The results are summarized in Table VI.

In Runs 61 and 62 samples were molded at the higher temperature of 136° C. The sample in Run 62 was annealed for two hours at 150° C. whereas the sample in Run 61 was not annealed. Since the HDT values in Runs 61 and 62 were essentially the same (162 vs. 167), there appeared to be no annealing effect perhaps indicating that both PMP and PPS, especially the PPS, attained maximum crystallization at the 136° F. mold temperature.

In Runs 63 and 64 samples were molded at the lower temperature of 38° C. The sample in Run 64 was annealed for two hours at 150° C. whereas the sample in Run 63 was not annealed. Since the HDT values in Runs 63 and 64 were not comparable (147 vs. 165), there appeared to be an annealing effect in the sample of Run 64. Although the properties of molded samples at the lower mold temperature were comparable, it is noteworthy that the HDT value of the sample in Run 64 was significantly greater than that of the non-annealed sample in Run 63. Perhaps this indicates that the PPS did not completely crystallize at the lower mold temperature of 38° C. It should be noted, however, that even at the lower mold temperature the HDT value of the non-annealed sample in Run 63 (147) was significantly greater than that of the sample in Control Run 31.

The results in Table VI indicate that higher mold temperatures should be used on the inventive molding compositions to realize maximum enhancement of HDT values in the injection molded samples.

TABLE VI

PMP and PPS Blends:
Effect of Processing Conditions on Properties
(30% Glass Reinforced)

| Run No. | 61 | 62 | 63 | 64 |
|---|---|---|---|---|
| Mold Temperature (°C.) | 136 | 136 | 38 | 38 |
| Annealing | No | Yes | No | Yes |
| Tensile Strength (ksi) | 6.8 | 7.1 | 6.8 | 7.0 |
| Elongation (%) | 3.4 | 3.2 | 3.2 | 3.0 |
| Flexural Strength (ksi) | 8.4 | 8.7 | 8.1 | 8.6 |
| Flexural Modulus (ksi) | 741 | 752 | 720 | 729 |
| Notched Izod (ft-lb/in) | 0.9 | 0.9 | 1.0 | 1.0 |
| Unnotched Izod (ft-lb/in) | 2.6 | 2.6 | 2.6 | 2.8 |
| HDT at 264 psi (°C.) | 162.1 | 166.7 | 147.1 | 165.3 |

GENERAL NOTES FOR ALL FLAME RETARDANT EXAMPLES

The weight ratio of the flame retardant to the antimony oxide synergist in each formulation was 3:1. The samples, in each of the following examples, were tested according to ANSI/UL94 Standard for tests for flammability of plastic materials for parts and devices and appliances. The specimen thickness was ⅛ of an inch. In these UL94 tests a result of V-0 is better than a V-1 and both of these results are better than a fail.

Example VII

This example describes flame retarded glass reinforced PMP molding compositions containing 2.5 to 10 weight percent PPS and 18 to 27 weight percent of decabromodiphenyloxide, a commercial flame retardant available as DE-83R from Great Lakes Chemical Corporation. Table VIIA shows the properties of injection molded samples prepared from compositions containing 18 weight percent DE-83R and 0, 2.5, 5 and 10 weight percent PPS. Table VIIB shows the properties of injection molded samples prepared from compositions containing 22.5 weight percent DE-83R and 0, 2.5, 5 and 10 weight percent PPS. Table VIIC shows the properties of injection molded samples prepared from compositions containing 27 weight percent DE-83R and 0, 2.5, 5 and 10 weight percent PPS.

Part A

Referring to runs 71A and 72A in Table VIIA, neither of which contained PPS, it is evident that the glass reinforced PMP sample without flame retardant (run 72A exhibited higher property values (except for flexural modulus) than did the sample of run 71A which contained 18 weight percent flame retardant (DE-83R). It is noteworthy that the samples of runs 71A and 72A failed to obtain V-0 (self extinguishing) ratings in the UL94 flammability test. Thus, the presence of a flame retardant in a glass reinforced PMP formulation was detrimental to the physical properties of the molded sample and did not render the composition flame resistant. Inventive runs 74A and 75A in Table VIIA show that the PPS at 5 and 10 weight percent levels enhanced flexural modulus and HDT values as well as flame retardancy. The samples of runs 74A and 75A rated V-0 in the UL94 test. Run 73A is noteworthy because it shows that 2.5 weight percent PPS is insufficient to enhance flame retardancy to a V-0 rating with only an 18 weight percent flame retardant loading. The HDT value in run 73A, however, was significantly greater than the observed values in runs 71A and 72A. Therefore it can be concluded that the addition of this flame retardant lowers the mechanical performance of the polymethylpentene composition. However, the addition of PPS restores both the mechanical performance as well as improving the flame retardancy of the combined composition.

TABLE VIIA

PMP and PPS Blends:
Interaction with Flame Retardant
Decabromodiphenyloxide 18 Wt % Flame Retardant
(30 Wt % Glass Reinforced)

| Run | 71A | 72A | 73A | 74A | 75A |
|---|---|---|---|---|---|
| % DE-83R[a] | 18.0 | Control | 18.0 | 18.0 | 18.0 |
| % PPS (Grade B) | 0 | 0 | 2.5 | 5.0 | 10.0 |
| Tensile Strength, Break (ksi) | 5.4 | 6.1 | 6.2 | 6.9 | 6.7 |
| Flexural Strength (ksi) | 7.4 | 8.6 | 8.3 | 8.4 | 8.6 |
| Flexural Modulus (ksi) | 920 | 710 | 990 | 995 | 1,080 |
| Notched Izod Impact (ft-lb/in) | 0.5 | 0.8 | 0.5 | 0.6 | 0.6 |
| Unnotched Izod Impact (ft-lb/in) | 1.3 | 2.2 | 1.5 | 1.7 | 1.5 |
| HDT @ 264 psi (°C.) | 122.5 | 124.3 | 157.3 | 165.2 | 161.7 |
| UL94 | V-1 | Fail | V-1 | V-0 | V-0 |
| Limiting Oxygen Index (LOI)[b] (%) | 31.5 | 25.5 | 29.2 | 30.0 | 31.5 |

[a]DE-83R represents decabromodiphenyloxide (DBDPO) (83% Br), available from Great Lakes Chemical Corporation.
[b]The limiting oxygen index (LOI) is expressed as the minimum volume percent of oxygen necessary in an oxygen/nitrogen mixture to sustain combustion of a burning sample. The magnitude of LOI numbers is directly proportional to flame retardant effectiveness.

Part B

Referring to runs 71B and 72B in Table VIIB, neither of which contained PPS, it can be seen that the flame retardant reduced the property values (except for modulus) in run 71B but the sample rated V-0 in the UL94 flammability test. Control run 72B without flame retardant failed the UL94 test. Inventive runs 73B, 74B and 75B in Table VIIB show that the PPS at 2.5, 5 and 10 weight percent levels enhanced flame retardancy (see higher LOI values compared to the LOI values of runs 71B and 72B), modulus values and HDT values. Thus, at the 22.5 weight percent loading of flame retardant, the PPS enhanced both the flame retardancy to the point of being self-extinguishing and the physical properties of the injection molded samples.

TABLE VIIB

PMP and PPS Blend:
Interaction with Flame Retardant
Decabromodiphenyloxide 22.5 Wt % Flame Retardant
(30 Wt % Glass Reinforced)

| Run | 71B | 72B | 73B | 74B | 75B |
|---|---|---|---|---|---|
| % DE-83R | 22.5 | Control | 22.5 | 22.5 | 22.5 |
| % PPS (Grade B) | 0 | | 2.5 | 5.0 | 10.0 |
| Tensile Strength, Break (ksi) | 5.4 | 6.1 | 6.0 | 6.4 | 6.4 |
| Flexural Strength (ksi) | 7.4 | 8.6 | 8.2 | 8.3 | 7.6 |
| Flexural Modulus (ksi) | 1,100 | 710 | 1,100 | 1,060 | 1,160 |
| Notched Izod Impact (ft-lb/in) | 0.5 | 0.8 | 0.5 | 0.5 | 0.5 |
| Unnotched Izod Impact (ft-lb/in) | 1.2 | 2.2 | 1.6 | 1.6 | 1.1 |
| HDT @ 264 psi (°C.) | 120.0 | 124.3 | 160.0 | 159.4 | 165.3 |
| UL94 | V-0 | Fail | V-0 | V-0 | V-0 |
| Limiting Oxygen Index (LOI) (%) | 29.2 | 25.5 | 30.8 | 32.1 | 33.6 |

Part C

Referring to runs 71C and 72C in Table VIIC, neither of which contained PPS, it is evident that properties (except for flexural modulus) were reduced by the flame retardant (run 71C) but the sample did rate V-0 in the UL94 test and possessed a desirably high LOI value of 33. The glass reinforced PMP sample (run 72C) without flame retardant failed the UL94 test. Inventive runs 73C, 74C and 75C in Table VIIC show that the PPS additive at 2.5, 5 and 10 weight percent levels maintained flame retardancy and enhanced HDT values of samples containing 27 weight percent flame retardant.

TABLE VIIC

PMP and PPS Blend:
Interaction with Flame Retardant
Decabromodiphenyloxide 27 Wt % Flame Retardant
(30 Wt % Glass Reinforced)

| Run | 71C | 72C | 73C | 74C | 75C |
|---|---|---|---|---|---|
| % DE-83R | 27.0 | Control | 27.0 | 27.0 | 27.0 |
| % PPS (Grade B) | 0 | | 2.5 | 5.0 | 10.0 |
| Tensile Strength, Break (ksi) | 5.1 | 6.1 | 5.8 | 5.9 | 6.4 |
| Flexural Strength (ksi) | 7.2 | 8.6 | 7.4 | 6.7 | 7.2 |
| Flexural Modulus (ksi) | 1,190 | 710 | 1,200 | 1,160 | 1,300 |
| Notched Izod Impact (ft-lb/in) | 0.5 | 0.8 | 0.5 | 0.4 | 0.5 |
| Unnotched Izod Impact (ft-lb/in) | 0.9 | 2.2 | 1.0 | 0.9 | 0.9 |
| HDT @ 264 psi (°C.) | 120.3 | 124.3 | 160.0 | 171.2 | 177.8 |
| UL94 | V-0 | Fail | V-0 | V-0 | V-0 |
| Limiting Oxygen Index (LOI) (%) | 33.0 | 25.5 | 33.6 | 34.9 | 35.4 |

Example VIII

This example describes flame retardant glass reinforced PMP molding compositions containing 2.5 to 10 weight percent PPS and 18 to 27 weight percent of brominated polystyrene, a commercial flame retardant available as Pyro-Chek 68PB (68% bromine) from Ferro Corporation. Table VIIIA shows the properties of injection molded samples prepared from compositions containing 18 weight percent Pyro-Chek 68PB and 0, 2.5, 5 and 10 weight percent PPS. Table VIIIB shows the properties of injection molded samples prepared from compositions containing 22.5 weight percent Pyro-Check 68PB and 0, 2.5, 5 and 10 weight percent PPS. Table VIIIC shows the properties of injection molded samples prepared from compositions containing 27 weight percent Pyro-Chek 68PB and 0, 2.5, 5 and 10 weight percent PPS.

Part A

Referring to runs 81A and 82A in Table VIII, neither of which contained PPS, it can be seen that the glass reinforced PMP sample without flame retardant (run 82A) had higher property values in general than did the sample of run 81A which contained 18 weight percent flame retardant (Pyro-Chek 68PB). Samples of both run 81A and 82A failed the UL94 flammability test. It is noteworthy that the samples in runs 83A and 84A at the 2.5 and 5 weight % PPS levels failed to enhance flame retardancy to a V-0 rating but HDT values were increased to about 155. Inventive run 85A shows that the PPS at the 10 weight percent levels enhanced flexural modulus and HDT values as well as flame retardancy. The injection molded sample in run 85A rated V-0 in the UL94 test. The data in Table VII suggest that between 5 and 10 weight percent PPS at the 18 wt % loading of flame retardant is required to obtain maximum enhancement of physical properties.

TABLE VIIIA

PMP and PPS Blends:
Interaction with Flame Retardant
Brominated Polystyrene 18 Wt % Flame Retardant
(30 Wt % Glass Reinforced)

| Run | 81A | 82A | 83A | 84A | 85A |
|---|---|---|---|---|---|
| % Pyro-Chek 68PB[a] | 18.0 | Control | 18.0 | 18.0 | 18.0 |
| % PPS (Grade B) | 0 | 0 | 2.5 | 5.0 | 10.0 |
| Tensile Strength, Break (ksi) | 5.4 | 6.1 | 5.9 | 6.3 | 6.6 |
| Flexural Strength (ksi) | 7.9 | 8.6 | 8.4 | 8.6 | 8.9 |
| Flexural Modulus (ksi) | 900 | 710 | 930 | 970 | 1,050 |
| Notched Izod Impact (ft-lb/in) | 0.5 | 0.8 | 0.6 | 0.6 | 0.7 |
| Unnotched Izod Impact (ft-lb/in) | 1.4 | 2.2 | 1.9 | 1.7 | 1.9 |
| HDT @ 264 psi (°C.) | 130.8 | 124.3 | 154.3 | 156.9 | 156.8 |
| UL94 | Fail | Fail | V-1 | V-1 | V-0 |
| Limiting Oxygen Index (LOI) (%) | 27.6 | 25.5 | 29.2 | 30.0 | 31.5 |

[a]Pyro-Chek 68PB represents a brominated polystyrene (68% bromine) available from Ferro Corporation.

Part B

Referring to runs 81B and 82B in Table VIIIB, neither of which contained PPS, it is evident that the presence of flame retardant at a 22.5 weight percent loading (run 81B) compromised the physical properties of a molded sample and the sample failed to rate V-0 in the UL94 flammability test. Run 82B is a glass reinforced PMP sample without flame retardant (control). Inventive samples 83B, 84B and 85B in Table VIIIB show that the PPS at the 2.5, 5 and 10 weight percent levels enhanced physical properties, particularly HDT values, and enhanced flame retardancy as evidenced by the higher LOI values and a V-0 rating in the UL94 flammability test. It is noteworthy that in Table VIIIB PPS was effective at 2.5 weight percent in runs wherein the flame retardant was at the 22.5 weight percent loading. As noted previously, the PPS was required at the 10 weight percent level to be fully effective in the presence of only 18 weight percent flame retardant (see Table VIIIA).

TABLE VIIIB

PMP and PPS Blends:
Interaction with Flame Retardant
Brominated Polystyrene 22.5 Wt % Flame Retardant
(30 Wt % Glass Reinforced)

| Run | 81B | 82B | 83B | 84B | 85B |
|---|---|---|---|---|---|
| % Pyro-Chek 68PB | 22.5 | Control | 22.5 | 22.5 | 22.5 |
| % PPS (Grade B) | 0 | 0 | 2.5 | 5.0 | 10.0 |
| Tensile Strength, Break (ksi) | 5.4 | 6.1 | 5.6 | 5.8 | 6.4 |
| Flexural Strength (ksi) | 7.7 | 8.6 | 8.7 | 8.5 | 9.1 |
| Flexural Modulus (ksi) | 940 | 710 | 1,030 | 1,050 | 1,140 |
| Notched Izod Impact (ft-lb/in) | 0.5 | 0.8 | 0.5 | 0.6 | 0.6 |
| Unnotched Izod Impact (ft-lb/in) | 1.2 | 2.2 | 1.3 | 1.5 | 1.5 |
| HDT @ 264 psi (°C.) | 138.0 | 124.3 | 153.9 | 155.9 | 159.9 |
| UL94 | V-1 | Fail | V-0 | V-0 | V-0 |
| Limiting Oxygen Index (LOI) (%) | 28.4 | 25.5 | 31.5 | 31.5 | 33.0 |

Part C

Referring to runs 81C and 82C in Table VIIIC, neither of which contained PPS, it can be seen in run 81C that a 27 weight percent loading of flame retardant reduced properties except for modest increases in modulus and HDT values. This sample rated V-0 in the UL94 test. A control run (No. 82C) with a glass reinforced PMP composition without flame retardant failed the UL94 flammability test.

Inventive runs 83C, 84C and 85C in Table VIIIC, show that the PPS at the 2.5, 5 and 10 weight percent levels dramatically enhanced modulus and HDT values. The enhanced flame retardancy of the sample was evidenced by the higher values of the LOI.

TABLE VIIIC

PMP and PPS Blends:
Interaction with Flame Retardant
Brominated Polystyrene 27 Wt % Flame Retardant
(30 Wt % Glass Reinforced)

| Run | 81C | 82C | 83C | 84C | 85C |
|---|---|---|---|---|---|
| % Pyro-Chek 68PB | 27.0 | Control | 27.0 | 27.0 | 27.0 |
| % PPS (Grade B) | 0 | 0 | 2.5 | 5.0 | 10.0 |
| Tensile Strength, Break (ksi) | 5.1 | 6.1 | 5.6 | 5.8 | 6.3 |
| Flexural Strength (ksi) | 7.3 | 8.6 | 8.4 | 8.6 | 9.1 |
| Flexural Modulus (ksi) | 980 | 710 | 1,100 | 1,160 | 1,230 |
| Notched Izod Impact (ft-lb/in) | 0.4 | 0.8 | 0.5 | 0.5 | 0.5 |
| Unnotched Izod Impact (ft-lb/in) | 1.1 | 2.2 | 1.5 | 1.2 | 1.0 |
| HDT @ 264 psi (°C.) | 138.3 | 124.3 | 152.1 | 154.8 | 158.9 |
| UL94 | V-0 | Fail | V-0 | V-0 | V-0 |
| Limiting Oxygen Index (LOI) (%) | 30.8 | 25.5 | 33.0 | 33.6 | 35.4 |

Example IX

This example describes a flame retarded reinforced PMP molding composition containing 10 weight percent PPS and 22.5 weight percent of a polydibromophenylene oxide, a commercial flame retardant available as PO-64P from Great Lakes Chemical Corporation. Table IX shows the properties of injection molded samples.

Referring to runs 91 and 92 in Table IX, neither of which contained PPS, it is evident in run 92 that a 22.5 weight percent loading of flame retardant reduced properties except for some increase in modulus and HDT values. This sample rated V-0 in the UL94 test. A control run (No. 91) with a glass reinforced PMP composition without flame retardant failed the UL94 flammability test. Inventive run 93 in Table IX, shows that the PPS additive at the 10 weight percent level enhanced modulus and HDT values. The enhanced flame retardancy of the sample was reflected by the higher LOI value (34.9).

TABLE IX

PMP and PPS Blends:
Interaction with Flame Retardant
Polydibromophenylene Oxide Flame Retardant
(30 Wt % Glass Reinforced)

| Run | 91 | 92 | 93 |
|---|---|---|---|
| % PO-64P[a] | Control | 22.5 | 22.5 |
| % PPS | 0 | 0 | 10.0 |
| Tensile Strength, Break (ksi) | 6.1 | 5.8 | 6.7 |
| Flexural Strength (ksi) | 8.6 | 8.3 | 8.2 |
| Flexural Modulus (ksi) | 710 | 1,030 | 1,200 |
| Notched Izod Impact (ft-lb/in) | 0.8 | 0.5 | 0.5 |
| Unnotched Izod Impact (ft-lb/in) | 2.2 | 1.2 | .8 |
| HDT @ 264 psi (°C.) | 124.3 | 150 | 160.2 |
| UL94 | Fail | V-0 | V-0 |
| Limiting Oxygen Index (LOI) (%) | 25.5 | 30.0 | 34.9 |

[a]PO-64P represents polydibromophenylene oxide (64% Br) available from Great Lakes Chemical Corporation.

Example X

This example describes flame retarded glass reinforced PMP molding compositions containing 5 and 10 weight percent PPS and 22.5 weight percent of a tetrabromobisphenol A carbonate oligomer, a commercial flame retardant available as BC-58 from Great Lakes Chemical Corporation. Table X shows the properties of injection molded samples.

Referring to runs 101 and 105 in Table X, none of which contained PPS, it can be seen that the flame retardant in the sample of run 101 and 104 reduced properties except for modulus and rated V-0 in the UL94 flammability test. The control sample in run 105 without flame retardant failed the UL94 flammability test. Inventive runs 102 and 103 in Table X show that the PPS at the 5 and 10 weight percent levels enhanced modulus and HDT values. These samples rated V-0 in the UL94 flammability test and possessed LOI values of about 32.

TABLE X

PMP and PPS Blends:
Interaction with Flame Retardant
Tetrabromobisphenol A Carbonate Oligomer
(30 Wt % Glass Reinforced)

| Run | 101 | 102 | 103 | 104 | 105 |
|---|---|---|---|---|---|
| % BC-58[a] | 22.5 | 22.5 | 22.5 | 27.0 | Control |
| % PPS | 0 | 5.0 | 10.0 | 0 | 0 |
| Tensile Strength, Break (ksi) | 4.9 | 6.0 | 6.4 | 4.9 | 6.1 |
| Flexural Strength (ksi) | 7.2 | 8.0 | 8.0 | 7.2 | 8.6 |
| Flexural Modulus (ksi) | 1,030 | 1,020 | 1,110 | 1,060 | 710 |
| Notched Izod Impact (ft-lb/in) | 0.4 | 0.6 | 0.6 | 0.5 | 0.8 |
| Unnotched Izod Impact (ft-lb/in) | 1.4 | 1.3 | 1.4 | .9 | 2.2 |
| HDT @ 264 psi (°C.) | 109.9 | 148.1 | 158.6 | 114.1 | 124.3 |
| UL94 | V-0 | V-0 | V-0 | V-0 | Fail |
| Limiting Oxygen Index (LOI) (%) | 31.5 | 31.5 | 33.0 | 31.5 | 25.5 |

[a]BC-58 represents tetrabromobisphenol A carbonate oligomer (58% Br), available from Great Lakes Chemical Corporation.

That which is claimed is:

1. A composition of matter consisting essentially of:
   about 99.5 to about 75 weight percent of composition (a), wherein the weight percent of composition (a) is based on the total weight of compositions (a) and (b), and wherein composition (a) consists essentially of unmodified polymethylpentene; and
   about 0.5 to about 25 weight percent of composition (b), wherein the weight percent of composition (b) is based on the total weight of compositions (a) and (b), and wherein composition (b) consists essentially of polyphenylene sulfide; and
   about 10 to about 67 weight percent of composition (c), wherein the weight percent of composition (c) is based on the total weight of compositions (a), (b), and (c), and wherein composition (c) consists essentially of glass fibers; and
   wherein composition (a), composition (b), and composition (c) are compounded at a temperature above the melting point of said unmodified polymethylpentene and said polyphenylene sulfide.

2. A composition of matter according to claim 1 wherein the amount of said composition (a) is from about 99 to about 91 weight percent and the amount of said composition (b) is from about 1 to about 9 weight percent.

3. A composition of matter according to claim 1 wherein the amount of said composition (a) is from 98 to 92 weight percent and the amount of said composition (b) is from 2 to 8 weight percent.

4. A composition of matter according to claim 1 wherein said glass fibers have a diameter from about 9 to about 13 micrometers and a length from about ⅛ to ½ of an inch.

5. A composition of matter consisting essentially of:
   about 99.5 to about 75 weight percent of composition (a), wherein the weight percent of composition (a) is based on the total weight of compositions (a) and (b), and wherein composition (a) consists essentially of unmodified polymethylpentene; and about 0.5 to about 25 weight percent of composition (b), wherein the weight percent of composition (b) is based on the total weight of compositions (a) and (b), and wherein composition (b) consists essentially of polyphenylene sulfide; and about 10 to about 67 weight percent of composition (c), wherein the weight percent of composition (c) is based on the total weight of compositions (a), (b), (c), and (d), and wherein composition (c) consists essentially of glass fibers; and about 5 to about 45 weight percent of composition (d), wherein the weight percent of composition (d) is based on the total weight of compositions (a), (b), (c), and (d), and wherein composition (d) consists essentially of flame retardants; and wherein at least composition (a), composition (b), and composition (c) are compounded at a temperature above the melting point of said unmodified polymethylpentene and said polyphenylene sulfide.

6. A composition of matter according to claim 5 wherein the amount of said composition (a) is from about 99 to about 91 weight percent and the amount of said composition (b) is from about 1 to about 9 weight percent.

7. A composition of matter according to claim 5 wherein the amount of said composition (a) is from 98 to 92 weight percent and the amount of said composition (b) is from 2 to 8 weight percent.

8. A composition of matter according to claim 5 wherein said glass fibers have a diameter from about 9 to about 13 micrometers and a length from about ⅛ to ½ of an inch.

9. A composition of matter according to claim 5 wherein said flame retardant is selected from the group consisting essentially of antimony compounds, boron compounds, brominated diphenyl oxides, brominated polystyrenes, polydibromophenylene oxides, brominated polycarbonate derivatives, and mixtures of two or more said flame retardants.

10. A composition of matter according to claim 5 wherein said flame retardant is selected from the group consisting essentially of antimony trioxide, zinc borate, decabromodiphenyloxide, and mixtures of two or more said flame retardants.

* * * * *